(12) United States Patent
Ohmori et al.

(10) Patent No.: US 7,698,743 B2
(45) Date of Patent: Apr. 13, 2010

(54) AUTHENTICATION SERVER, METHOD AND SYSTEM FOR DETECTING UNAUTHORIZED TERMINAL

(75) Inventors: Motoji Ohmori, Osaka (JP); Shunji Ohara, Osaka (JP); Takashi Katayama, Osaka (JP)

(73) Assignee: Panasonic Corporation, Osaka (JP)

( * ) Notice: Subject to any disclaimer, the term of this patent is extended or adjusted under 35 U.S.C. 154(b) by 1021 days.

(21) Appl. No.: 10/577,435

(22) PCT Filed: Dec. 20, 2004

(86) PCT No.: PCT/JP2004/019488

§ 371 (c)(1),
(2), (4) Date: Apr. 27, 2006

(87) PCT Pub. No.: WO2005/069295

PCT Pub. Date: Jul. 28, 2005

(65) Prior Publication Data

US 2007/0088945 A1 Apr. 19, 2007

(30) Foreign Application Priority Data

Jan. 16, 2004 (JP) ............................ 2004-009861

(51) Int. Cl.
*G06F 12/14* (2006.01)
*G06F 7/04* (2006.01)
*H04L 9/32* (2006.01)

(52) U.S. Cl. .................... 726/27; 713/155; 726/31; 726/32; 705/57

(58) Field of Classification Search .................. 713/155; 726/31–33; 380/201–203; 705/57, 59, 67; 709/227–229
See application file for complete search history.

(56) References Cited

U.S. PATENT DOCUMENTS

| 5,949,877 A | 9/1999 | Traw et al. |
| 6,202,158 B1 * | 3/2001 | Urano et al. ................... 726/22 |
| 6,442,626 B1 | 8/2002 | Smola et al. |
| 7,266,202 B1 * | 9/2007 | Kawakami et al. .......... 380/283 |

(Continued)

FOREIGN PATENT DOCUMENTS

| EP | 1 349 034 | 10/2003 |
| JP | 2002-217890 | 8/2002 |
| WO | 03/096339 | 11/2003 |

*Primary Examiner*—Minh Dieu Nguyen
(74) *Attorney, Agent, or Firm*—Wenderoth, Lind & Ponack, L.L.P.

(57) ABSTRACT

A DVD terminal (20) makes a request for sending a sub-content to an authentication server (40) (in this case, attaches the "model name and serial number" of the DVD terminal (20)) (S302). The authentication server (40) generates a random number R (S304) and sends it to the DVD terminal (20) (S306). The DVD terminal (20) reads a terminal key and a terminal ID that are stored in a terminal information memory unit (25), decrypts the received random number R using a terminal key (SK_X) (S308) and sends this and the terminal ID (ID_X) to the authentication server (40) (S310). The authentication server (40) verifies the random number R and the terminal ID that are received from the DVD terminal (20) and encrypted, and judges whether the DVD terminal (20) is the authenticated terminal or not (S312).

8 Claims, 10 Drawing Sheets

U.S. PATENT DOCUMENTS

| | | | |
|---|---|---|---|
| 7,293,294 B2 * | 11/2007 | Ukai et al. | 726/32 |
| 7,346,580 B2 * | 3/2008 | Lisanke et al. | 705/50 |
| 7,472,282 B1 * | 12/2008 | Fujii et al. | 713/186 |
| 7,478,432 B2 * | 1/2009 | Echizen et al. | 726/26 |
| 2004/0117663 A1 * | 6/2004 | Colvin | 713/202 |
| 2005/0160284 A1 * | 7/2005 | Kitani et al. | 713/193 |

\* cited by examiner

FIG. 4A

| Model name+serial numbers | Terminal ID | Terminal key | Download history of sub-content |
|---|---|---|---|
| DVM-1234-NNNNN | ABC5566 | DEF7890 | Director's cut version ○○○ ... |
| DVM-2345-NNNNN | UVW6677 | XYZ8901 | Making film △△△ ... |
| ... | ... | ... | ... |

FIG. 4B

| Model name | Manufacturer name | Terminal key | Total number of terminal keys | Access number |
|---|---|---|---|---|
| DVM-1234 | Company A | DEF 7890 | 10,000 | 18,500 |
| DVM-5678 | Company B | XYZ 8901 | 50,000 | 36,200 |
| ... | ... | ... | ... | ... |

AUTHENTICATION SERVER, METHOD AND SYSTEM FOR DETECTING UNAUTHORIZED TERMINAL

BACKGROUND OF THE INVENTION

1. Field of Invention

The present invention relates to an apparatus, a method and a system for detecting a terminal that is manufactured in an unauthorized way, and specifically relates to an apparatus for detecting a DVD player and the like on the network for which a decryption key is generated in an unauthorized way.

2. Description of the Related Art

Recently, various kinds of recording media (such as Digital Versatile Discs (DVD) and apparatuses for playing them back (such as DVD discs) storing a package content (such as video and music soft) have become popular, and various kinds of measures are taken in order to protect their copy rights.

For example, there is a method for decrypting an encrypted content stored in a DVD using a terminal key (or "device key") stored in a DVD player (refer to related art 1). In this case, an exclusive terminal key is used for each of players. Also, after paying a license fee, the manufacturer of a DVD player receives, from a licensor, one or more terminal keys depending on the license fee.

On the other hand, in a communication system where a center and a group of plural terminals that are connected to the communication network uses a group key, a method for automatically detecting and eliminating an illicitly-copied terminal (for example, refer to related art 2, the Japanese Laid-Open Patent 2002-217890 publication) is also proposed. At the time of distributing a new group key to a terminal, a center connected to the communication network receives, from a terminal, a terminal ID and information obtained by decrypting a terminal random number using a public key of the center, searches communication logs and checks whether there is another terminal for which an identical terminal ID and a different terminal random number are used. In the case where there is such a terminal, the center judges that it is a copy terminal, and it does not distribute any group key. In this case, it is difficult to copy a random number generated in a terminal, which makes it possible to detect the copy terminal that used the random number as an unauthorized terminal in the case where the same random number is detected.

However, in a method of the above-mentioned related art 1, there may be a case where unauthorized terminal keys for which license fee is not paid and a case where a terminal key is decrypted from an authorized DVD player by an illicit analysis and a DVD player where the decrypted terminal key is stored is illicitly copied. The problem in this case is that it is difficult to detect the fact that "an identical terminal key is stored in a plurality of terminals" and detect "which terminal key of an authorized DVD player is stored in an unauthorized DVD player" is difficult.

FIG. 1 is a diagram for explaining the outline of the problem in the above-mentioned related art 1. As shown in FIG. 1, the apparatus manufacturer 100 pays a licensor 150 for license fee for ten thousand apparatuses, receives ten thousand authorized terminal keys (KA1 to KA10000) from the licensor 150 (or a key management company trusted by the licensor 150).

However, like the apparatus manufacturer 200, it is possible to obtain a terminal key (kB1) after paying the licensor 150 for the license fee for an apparatus, illicitly make 9999 copy terminal keys from the terminal key and stores them in ten thousand apparatuses respectively. In addition, like the apparatus manufacturer 300, it is possible to obtain a terminal 201 manufactured by the apparatus manufacturer 200 without paying the licensor 150 for the license fee, illicitly copy the terminal key KB1 stored in the terminal and store the identical terminal keys KB1 in all terminals.

Also, the method of above related art 2 enables detecting whether it is an illicitly-copied terminal or not, but detecting "which terminal key of an authorized DVD player is stored in an unauthorized DVD player" is difficult.

Therefore, an object of the present invention is to provide the authentication server, the unauthorized terminal detection method and the like that enables detecting the fact that the identical terminal key is stored in a plurality of terminals for which terminal key of an authorized terminal is stored in an unauthorized terminal.

BRIEF SUMMARY OF THE INVENTION

In order to achieve the above-mentioned object, the authentication server concerning the present invention detects an unauthorized terminal in terminals that accessed the authentication server via a network, the authentication server comprising: a terminal information receiving unit operable to receive, from a terminal, authentication data generated based on a terminal key that is previously given to the terminal and a terminal ID that is identification information assigned to said each manufactured terminal; a terminal key verification unit operable to verify authenticity of the terminal key using the received authentication data; a terminal information search unit operable to previously hold predetermined terminal information concerning a plurality of terminal and try to search the received terminal ID based on the terminal information; and an unauthorized terminal determination unit operable to determine that the terminal is an unauthorized terminal in the case where the terminal key verification unit verifies the authenticity of the terminal key, but the terminal key verification unit detects a terminal ID different from the received terminal ID.

In this way, even in the case where a terminal key is generated and copied in an unauthorized manner, it is possible to easily judge whether it is an unauthorized terminal or not in the case where its terminal ID does not match the terminal ID assigned to the terminal registered in association with the original terminal key.

Further, in order to achieve the above object, the unauthorized terminal detection system concerning the present invention comprises an authentication server that detects an unauthorized terminal in terminals that accessed the authentication server via a network and a terminal that can access the authentication server via a network, wherein the terminal includes a terminal information sending unit operable to send, to the authentication server, authentication data generated based on a terminal key that is previously given to the terminal and a terminal ID that is identification information assigned to said each manufactured terminal. The authentication server includes: a terminal information receiving unit operable to receive, from the terminal, authentication data generated based on the terminal key and the terminal ID; a terminal key verification unit operable to verify authenticity of the terminal key using the received authentication data; a terminal information search unit operable to previously hold predetermined terminal information concerning a plurality of terminals and try to search the received terminal ID; and an unauthorized terminal determination unit operable to determine that the terminal is an unauthorized terminal in the case where the terminal key verification unit verifies the authenticity of the terminal key, but the terminal key verification unit detects a terminal ID different from the received terminal ID.

In this way, even in the case where a terminal key is generated and copied in an unauthorized manner, it is possible to easily judge whether the terminal that accessed the authentication server is an unauthorized terminal or not in the case where its terminal ID does not match the terminal ID assigned to the terminal registered in association with the original terminal key, which makes it possible to control the occurrence of unauthorized terminals and finally minimize the copy right infringement on the package content.

Note that the present invention can be realized as an unauthorized terminal detection method making unique units included in the above authentication server as steps or a program causing a personal computer and the like to execute these steps. In addition, the program can be widely distributed via recording media such as DVDs or communication media such as the Internet.

As clear from the above explanation, with the present invention, it becomes possible to easily detect the case where the same terminal key is stored in plural terminals in an unauthorized manner and which terminal key of an authorized terminal is stored in an unauthorized terminal. This results in preventing the occurrence of unauthorized terminals that do not observe restrictions and rules concerning copy right protection, and thus it becomes possible to appropriately protect the copy right of a package content.

Therefore, the present invention is highly practical today when digital copy-righted products stored in DVD and the like are increasingly delivered and distributed via networks such as the Internet.

The disclosure of Japanese Patent Application No. 2004-009861 filed on Jan. 16, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 4A is an example of data stored in an authentication DB of the authentication server;

FIG. 4B is an example of data stored in an authentication DB of the authentication server;

DETAILED DESCRIPTION OF THE INVENTION

An embodiment concerning the present invention will be explained below with reference to figures.

Figure 1:
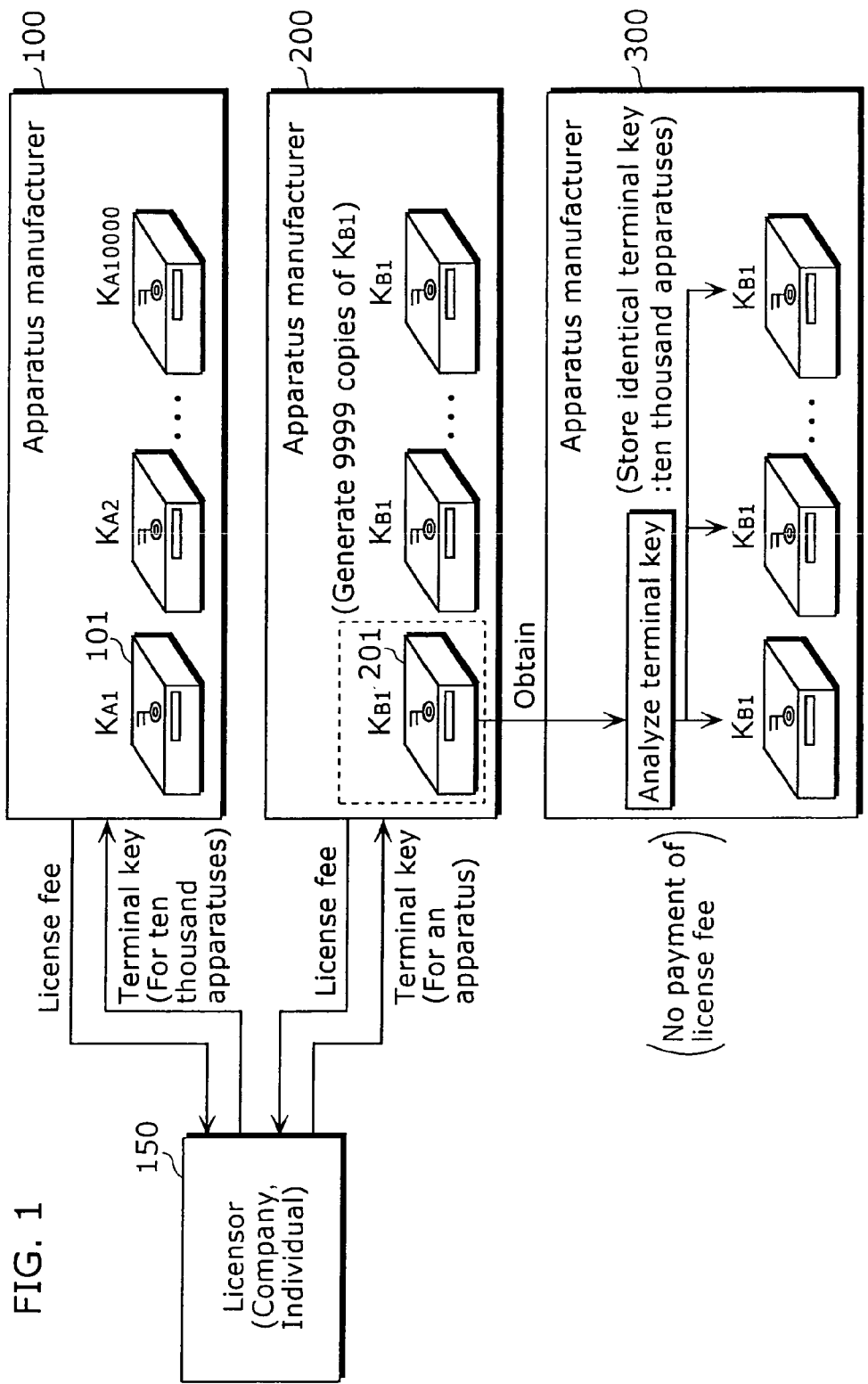
FIG. 1 is a diagram for explaining the outline of the problem in a related art.
Figure 2:
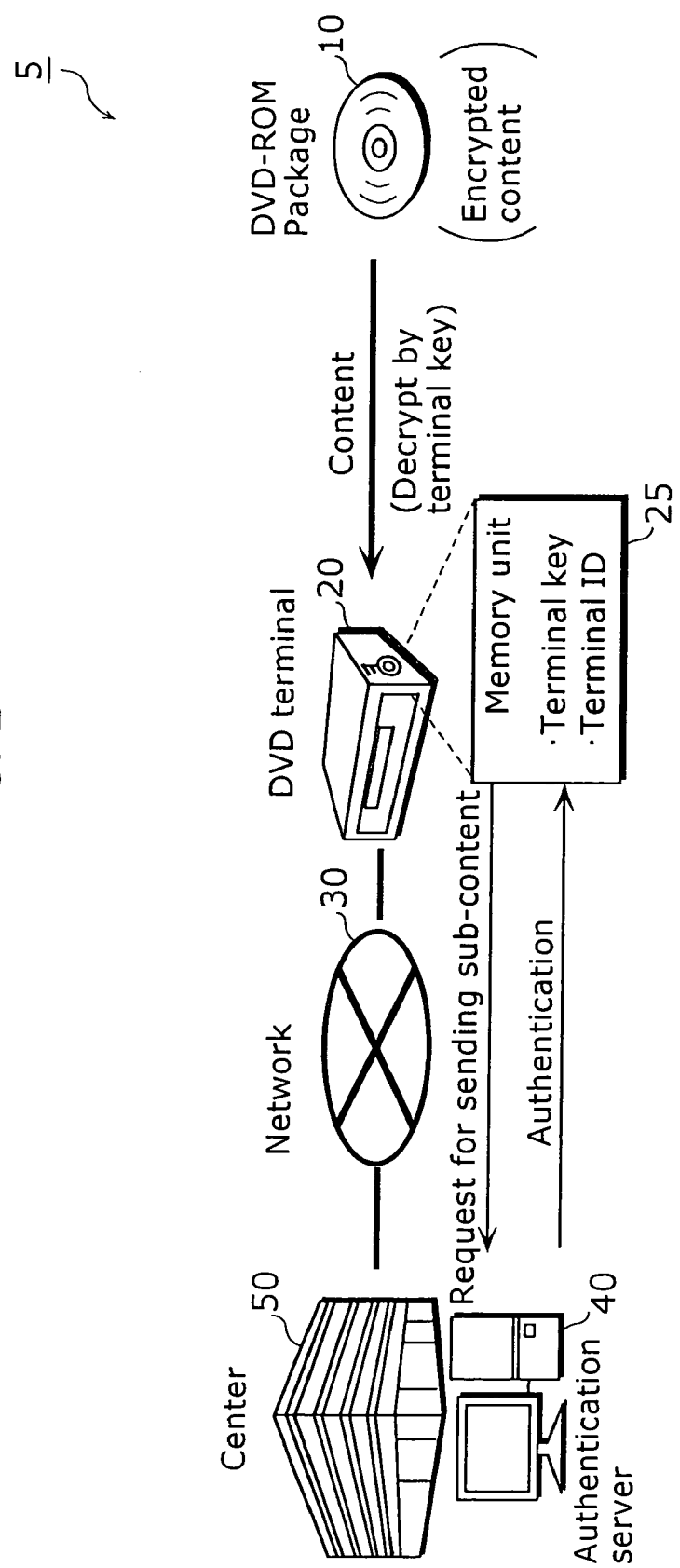
FIG. 2 is a block diagram showing the outline of an unauthorized terminal detection system in the embodiment.

FIG. 2 is a block diagram showing the outline of an unauthorized terminal detection system 5 in this embodiment. The unauthorized terminal detection system 5 in FIG. 2 is a system for detecting a terminal (such as a DVD player) that is illicitly manufactured using a network 30, and an authentication server 40 of a center 50 for detecting the above terminal and a DVD terminal 20 to be checked (at least one DVD terminal 20 is included) are connected via, for example, the network 30 such as the Internet. Here, "illicitly manufactured" means "manufactured without authorization". For example, the case of storing a terminal key necessary for decrypting an encrypted content (such as an encrypted package soft stored in a DVD-ROM) in a terminal (such as a DVD player) for playing back the above package content in an unauthorized manner.

Here, the outline of the detection method of a copy terminal in this system 5 will be explained. In the embodiment, three conceivable usage forms of a DVD-ROM package 10 will be explained below.

(1) using a content (such as a movie content) itself stored in a DVD-ROM package 10, (2) obtaining, from a center 50 on the network 30, a sub-content (such as a sub-content for subtitles corresponding to a movie content) related to the content in the above-mentioned (1) and using the sub-content, and (3) obtaining, from a center 50 on the network 30, the encrypted sub-content (such as a director's cut video and an extra video) related to the content in the above-mentioned (1) and using the sub-content after paying an additional fee. In this case, the key (decryption key) for decrypting the above sub-content or the sub-content itself can be obtained from the center 50 by paying the fee.

Therefore, in the case of the above (2) and (3), the user surely connects the DVD terminal 20 to the center 50, therefore, the user automatically authenticates the DVD terminal 20 using the authentication server 40 at that time. To be more specific, the user authenticates the DVD terminal 20 using so-called a "challenge-response type authentication method" at the time of requesting the DVD terminal 20 to send a sub-content to the authentication server 40.

For example, in the case of performing the "challenge-response type authentication method" using a secret key encryption method, the authenticating side (the authentication server 40 in the embodiment) and the authenticated side (the DVD terminal 20 in the embodiment) have an identical terminal key (secret key). In this case, the authentication server 40 side memorizes "the model name and the serial number" of the DVD terminal and the terminal key in an associated manner, and "the model name and the serial number" sent from the DVD terminal 20 makes it possible to uniquely specify the terminal key stored by the DVD terminal 20. In other words, the "serial number" in this case plays a role of an index for specifying the above. After that, the DVD terminal 20 sends an authentication request to the authentication server 40. The authentication server 40 that received an authentication request from the DVD terminal 20 generates a random number and sends it to the DVD terminal 20. The DVD terminal 20 encrypts the received random number using a self-holding terminal key and sends the random number to the authentication server 40 along with the terminal ID. The authentication server 40 that received the data of encrypted random number and the terminal ID from the DVD terminal 20 decrypts the random number using the same self-holding terminal key as the one held by the DVD terminal 20 and checks whether the terminal key held by the DVD apparatus 20 is an authorized terminal key or not. Further, the authentication server 40 checks whether the terminal ID received from the DVD terminal 20 matches the terminal ID that is previously registered. In the case where the random number sent by the authentication server 40 to the DVD terminal 20 does not match the random number decrypted by the authentication server 40 (or in the case where the random number cannot be decrypted), the authentication server 40 judges that the DVD terminal 20 is an "unauthorized terminal". Especially, in the case where the random number can be decrypted correctly but the terminal ID does not match, the authentication server 40 judges that the terminal key of the DVD apparatus 20 is "copied in an unauthorized manner". Here, the "terminal ID" is the information for identifying a DVD terminal such as a user ID or a service ID specified and registered at the time when a user purchases the above DVD terminal 20 or enters into a service. Here are other examples of terminal IDs: an IP address; a MAC address; a name written by a user; and a nickname arbitrary given to a user. Note that the terminal ID may be confirmed as not identical to another terminal ID that has already been registered and then registered at the time of purchasing the above DVD terminal 20 or entering into the service.

On the other hand, an example case where a "challenge-response type authentication" is performed using a public key encryption method will be shown below. The authentication server 40 holds a public key of Certificate Authority (CA). The DVD terminal 20 sends the self public key certificate along with the authentication request to the authentication server 40. The authentication server 40 checks the authenticity of the public key certificate received from the DVD terminal 20 using the self-holding public key of the Certificate Authority. In the case where the authentication server 40 confirms that the public key certificate is authentic, it generates a random number and sends it to the DVD terminal 20. The DVD terminal 20 writes a digital signature on the received random number using the self-holding terminal key (secret key) and sends it along with the terminal ID as authentication data to the authentication server 40. In this way, the authentication server 40 verifies the authenticity of the received authentication data using the public key of the DVD terminal 20 corresponding to the verified public key certificate. The authentication server 40 judges that the DVD terminal 20 is an "unauthorized terminal" in the case where the authenticity of the received authentication data cannot be verified, while the authentication server 40 judges that the DVD terminal 20 is an "authorized terminal" in the case where the authenticity of the received authentication data is verified.

Note that "terminal keys" vary depending on respective DVD terminals 20, the terminal keys being, for example, a secret key in the secret key encryption method like the above (the authentication server 40 and the DVD terminal 20 have an identical secret key in this case) or a secret key in the public key encryption method (the DVD terminal 20 sends a self public key certificate to the authentication server 40, and the authentication server 40 holds a public key of the DVD terminal 20 included in the received public key certificate in this case). Here, the "public key certificate" includes "a model name and a serial number" of the DVD terminal, a "terminal ID", a "public key" and a "digital signature to the pair of the terminal ID and the public key" (of course, it is possible to give digital signature to the pair of "the model name and the serial number" and "a public key" of the DVD terminal).

Figure 3:
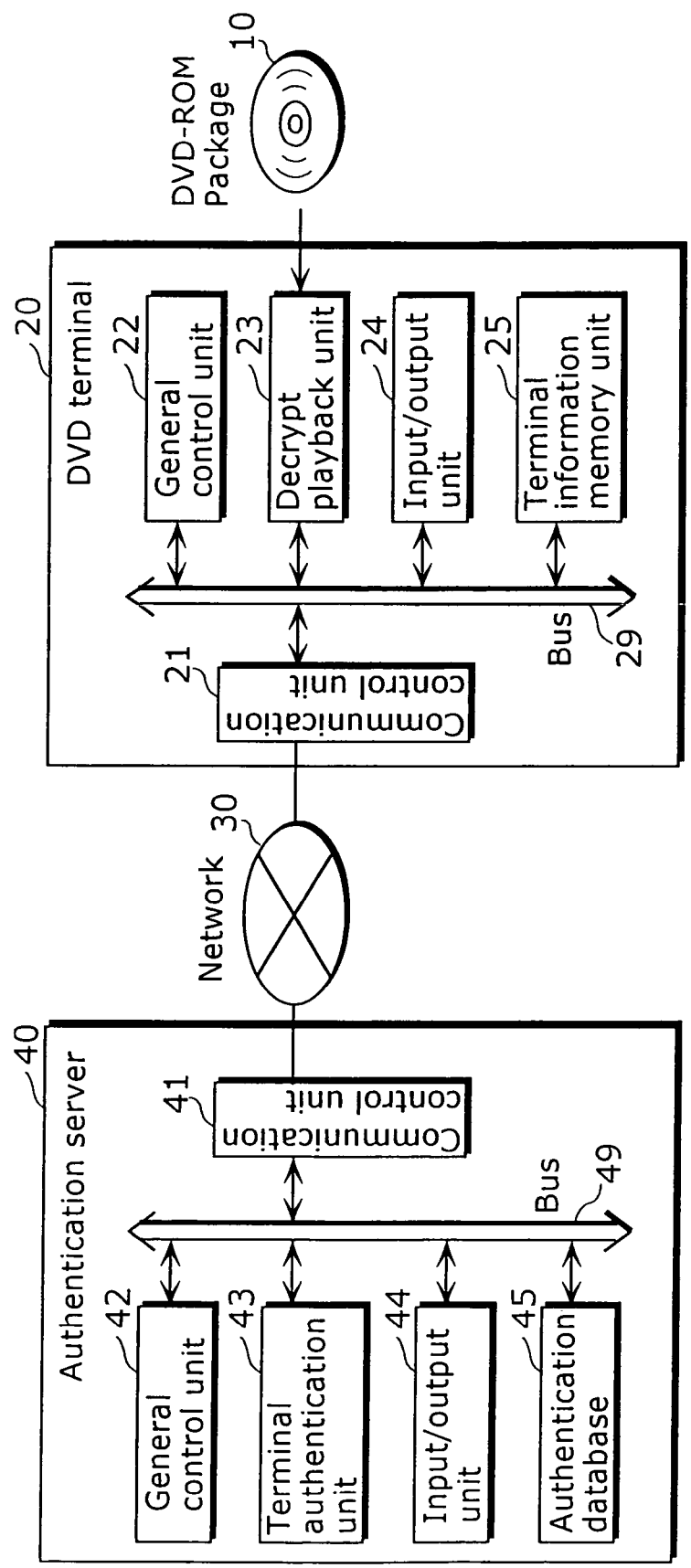
FIG. 3 is a block diagram showing the functional structure of a DVD terminal and an authentication server in an unauthorized terminal detection system.

FIG. 3 is a block diagram showing the functional structure of the DVD terminal 20 and the authentication server 40 in this system 5. The DVD terminal 20 in FIG. 3 is a DVD player that has a function for decrypting and playing back a content stored in the DVD-ROM package 10 and a function for obtaining various kinds of sub-contents from the authentication server 40 via the network 30. The DVD terminal 20 includes a communication control unit 21, a general control unit 22, a decrypt playback unit 23, an input/output unit 24 and a terminal information memory unit 25. Note that these units in the DVD terminal 20 are connected to each other via a bus 29.

The communication control unit 21 performs control for communicating with the authentication server 40 via the network 30. The general control unit 22 is a micro computer that has a RAM, a ROM or the like and controls the entire DVD terminal 20. The decrypt playback unit 23 decrypts and plays back the encrypted content that is stored in the DVD-ROM package 10. The input/output unit 24 has switches, a liquid panel and the like, receives user operations and presents necessary information to the user. The terminal information memory unit 25 is, for example, a secure RAM (that is tamper-proof), and stores a terminal key (one of various secret keys), a public key, a public key certificate and the like and a terminal ID. Here, an unauthorized third person cannot refer to and update the information stored in the terminal information memory unit 25.

On the other hand, the authentication server 40 in FIG. 3 is a server for authenticating the terminal that requests for a sub-content via the network 30 and includes a communication control unit 41, a general control unit 42, a terminal authentication unit 43, an input/output unit 44 and an authentication DB 45. Note that these units in the authentication server 40 are connected to each other via a bus 49.

The communication control unit 41 controls the communication function of the authentication server 40 like the communication control unit 21 in the above DVD terminal 20. The general control unit 42 is, for example, a micro computer that has a RAM, a ROM or the like, and controls the entire authentication server 40. The terminal authentication unit 43 authenticates the DVD apparatus based on the terminal key stored in the authentication DB 45, the terminal ID and the terminal ID received from the DVD terminal.

The input/output unit 44 includes keyboards and a liquid panel and the like, receives operations of a manager and the like of the center 50 and presents necessary information to the manager and the like. The authentication DB 45 registers or stores a terminal key (one of various kinds of secret keys), a public key, a public key certification and the like and a terminal ID of each DVD terminal in an associated manner.

FIG. 4 shows an example of data stored in the above authentication DB 45. FIG. 4A is a table example for storing (i) a model name and a serial number, (ii) a terminal ID, (iii) a terminal key and (iv) a sub-content send request history of each DVD terminal in an associated manner. This "model name and serial number" enables identifying the DVD terminal. Note that "the model name and the serial number" of FIG. 4A and the terminal key is the data determined at the time when the DVD terminal is manufactured, and the terminal ID is determined (or registered in the authentication server 40 after being manufactured) at the time of purchasing the DVD terminal or entering into the service as mentioned above.

Also, FIG. 4B is a table example for storing a model of a DVD terminal, a manufacturer name of the DVD terminal, a terminal key, the number of terminal keys and the number of accesses that are stored in the above DB 45 for authentication in an associated manner.

Figure 5:
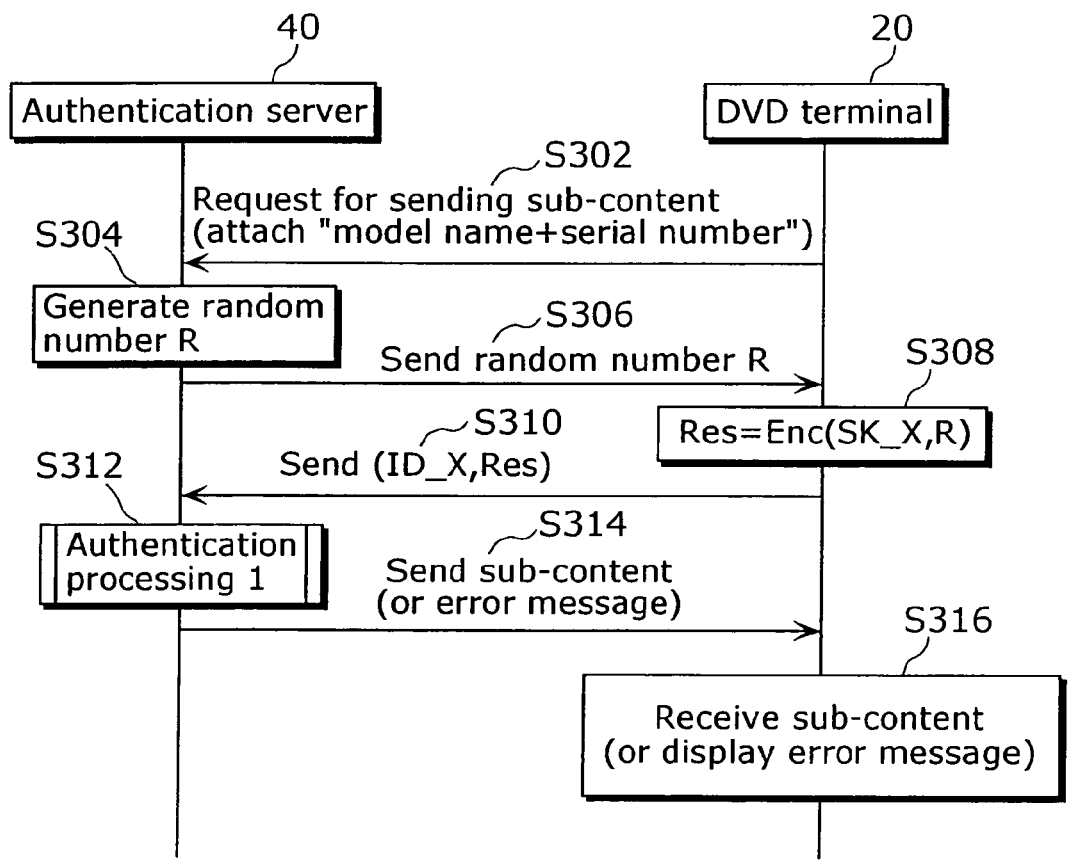
FIG. 5 is a communication sequence diagram between the DVD terminal and the authentication server in the case where the DVD terminal obtains a sub-content.

Next, the operation of the unauthorized terminal detection system 5 composed like up to this point will be explained. FIG. 5 is a communication sequence diagram between the DVD terminal 20 and the authentication server 40 in the case where the above usage form (2), that is, the DVD terminal 20 obtains a sub-content.

First, the DVD terminal 20 makes a sub-content send request (in this case, "a model name and a serial number" of the DVD terminal 20 is attached) (S302).

In this way, the authentication server 40 generates a random number R (S304) and sends it to the DVD terminal 20 (S306). In response to this, the DVD terminal 20 reads the terminal key and the terminal ID that are stored in the terminal information memory unit 25, encrypts (=Res) the received random number R using the terminal key (SK_X) (S308) and sends this Res and the terminal ID (ID_X) to the authentication server 40 (S310).

Next, the authentication server 40 verifies the encrypted random number R and the terminal ID that are received from the DVD terminal 20 and judges whether the DVD terminal 20 is an authorized terminal or not (S312: authentication processing 1). In the case where the authentication server 40 judges that the DVD terminal 20 is an authorized terminal, it sends a sub-content as requested to the DVD terminal 20 (S314). In the case where the authentication server 40 judges that the DVD terminal 20 is an unauthorized terminal, it sends an error message specified depending on the error to the DVD terminal 20 (a statement in the parentheses of S314).

On the other hand, the DVD terminal 20 records or plays back this in the case where it receives a sub-content from the authentication server 40 (S316), while it displays an error message on the input/output unit 24 in the case where it receives the error message (S316).

As an error message, a warning or the like such as "This service cannot be received by this terminal." and "This terminal becomes incapable of playing back a ROM package sometime." is displayed in a local language (for example, a language used in an area where the DVD terminal is sold and the like).

Note that some contents include a service for providing an "extra content" that is periodically updated although it is not a display as an error message. In this case, as the terminal automatically accesses the center periodically, it is possible to securely perform the above authentication by displaying, on the input/output unit 24, a message such as "Stay connected to the network to update the extra content automatically".

Figure 6:
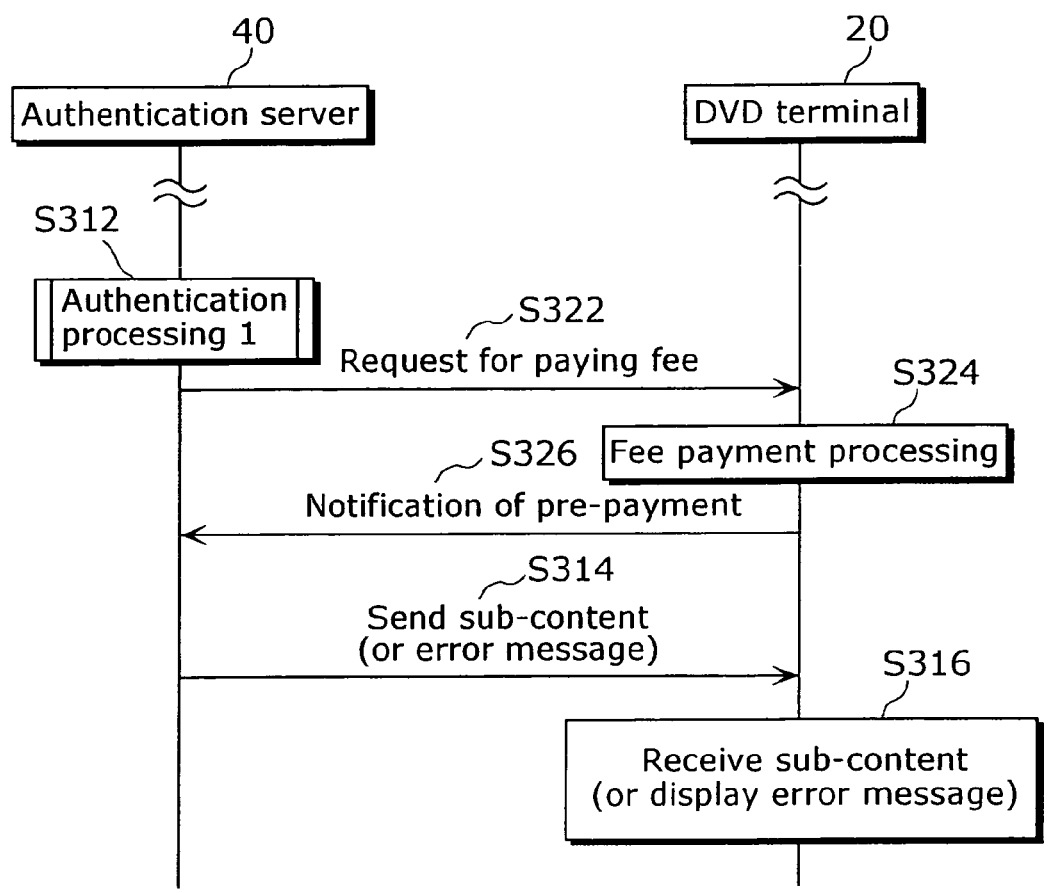
FIG. 6 is a communication sequence diagram between the DVD terminal and the authentication server in the case where the DVD terminal obtains a fee-based sub-content.

Also, FIG. 6 is a communication sequence diagram between the DVD terminal 20 and the authentication server 40 in the case where the above usage form (3), that is, the DVD terminal 20 obtains a fee-based sub-content. Note that the part up to the authentication processing 1 (S312) in FIG. 6 is the same as the corresponding part in the above FIG. 5, and explanation on the part will be omitted.

The authentication server 40 judges whether the sub-content requested by the DVD terminal 20 is a fee-based sub-content or not, and in the case where it is a fee-based sub-content, it requests the DVD terminal 20 to pay the fee (S322). The DVD terminal 20 that received the "fee payment request" performs a fee payment processing (S324) and sends a notification of pre-payment to the authentication server 40 (S326).

The authentication server 40 that received the "notification of pre-payment" from the DVD terminal 20 sends the sub-content (or an error message) to the DVD terminal 20 (S314).

Note that the following processing is the same as the processing of S312 in FIG. 5, and the process S316 is omitted because it is the same as the above-mentioned one in the explanation of FIG. 5.

Figure 7:
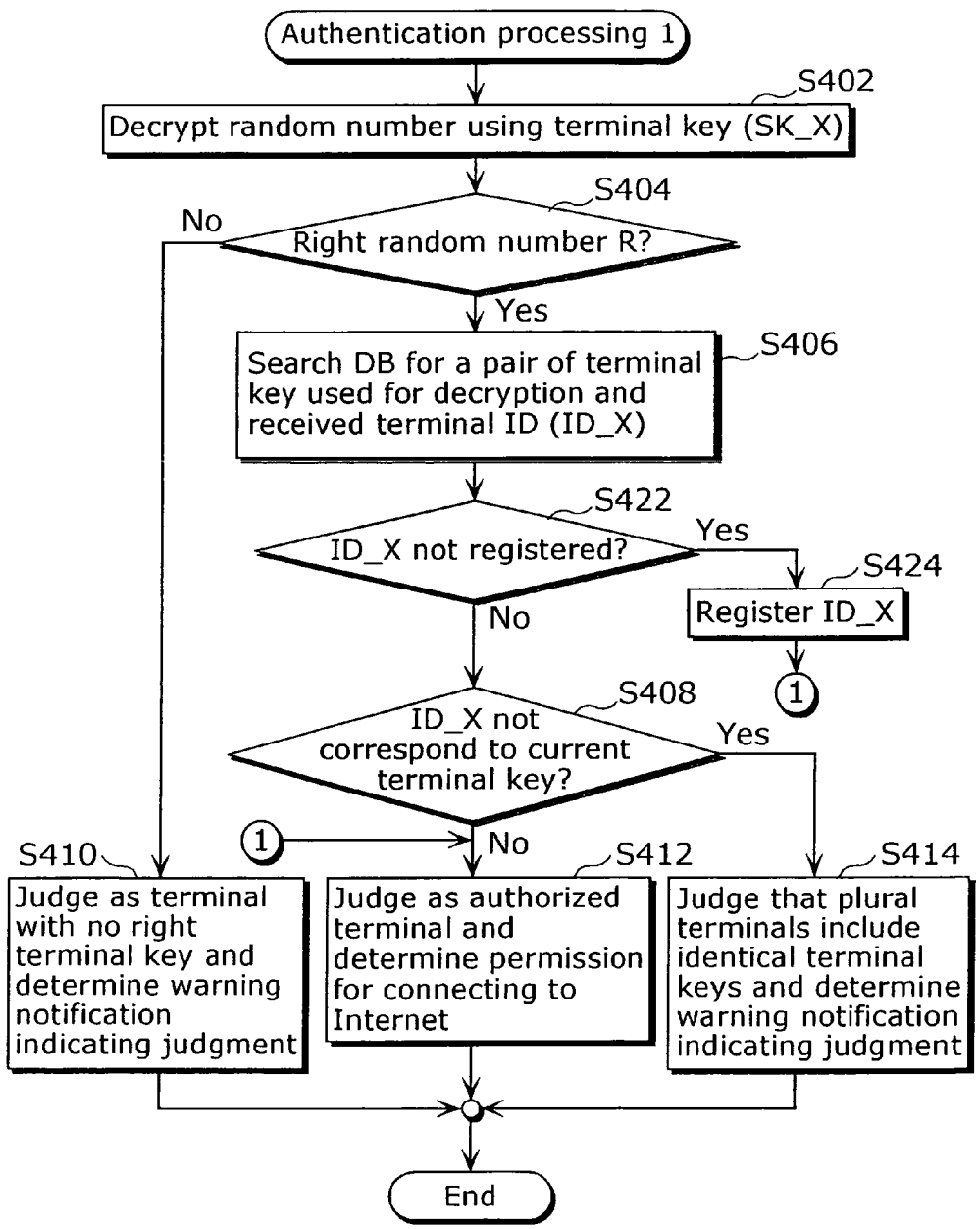
FIG. 7 is a flow chart showing the flow of authentication processing 1 in the authentication server shown in FIG. 5 and FIG. 6.

FIG. 7 is a flow chart showing the processing descriptions of the authentication processing 1 (S312) in the authentication server 40 shown in the above FIG. 5 and FIG. 6.

First, on receiving the terminal ID (ID_X) and the encrypted random number R (=Res) from the DVD terminal 20 via the communication control unit 41, the terminal authentication unit 43 decrypts the encrypted random number R using the same terminal key (ID_X) stored in the authentication DB 45 as the one in the DVD terminal 20 (S402).

In the case where the random number R is not correct as a result of decryption (or cannot be decrypted) (S404: No), the terminal authentication unit 43 judges that the terminal authentication unit 43 is the DVD terminal that does not have a correct terminal key, specifies an error message and the like indicating the judgment, and determines sending a warning notification (S410).

On the other hand, in the case where the random number R is correct as a result of decryption (S404: Yes), the terminal authentication unit 43 further searches the authentication DB 45 for a pair of the terminal key used for decrypting the random number R and the terminal ID (ID_X) received from the DVD terminal 20 (S406). In addition, in the case where the terminal ID (ID_X) is registered (S422: No) and this terminal ID is the terminal ID corresponding to the terminal key (S408: No) as a result of the search, the terminal authentication unit 43 determines that the terminal that sends the above terminal ID and the encrypted random number R is an "authorized terminal", and permits connecting to the network (called "network connection permission" from here). Note that, in the case where the terminal ID (ID_X) has not registered yet (S422: Yes), the terminal authentication unit 43 registers the terminal ID (S424).

However, in the case where the received terminal ID is not the terminal ID corresponding to the above terminal key (S408: Yes), the terminal authentication unit 43 judges as "an identical terminal key is stored in plural DVD terminals" and specifies a corresponding error message, and determines sending a warning notification to the above DVD terminal 20 (S414).

Up to this point, with the authentication server concerning the embodiment, using a pair of the above terminal key and the terminal ID in order to authorize the terminal makes it possible to judge whether the terminal is an authorized terminal or not more correctly.

(Variation 1)

An example where the authentication server 40 judges whether the DVD terminal 20 is authorized or not based on the encrypted random number R and the terminal ID that are received from the DVD terminal 20 has already been explained in the above embodiment, but in the case where a different DVD terminal has an identical terminal key and an identical terminal ID, it is difficult for the authentication server 40 to judge whether these DVD terminals are authorized or not. Therefore, in this variation, the terminal judges that "This is an unauthorized terminal that has a copy terminal key" in the case where a sub-content can be received only once and a DVD terminal that has an identical terminal key and an identical terminal ID that accessed the sub-content more than once. An example case is that there are 18,500 accesses although the number of terminal keys is 10,000 (refer to the above FIG. 4B). Note that the access limit is not limited to once, it may be set at a plural times.

Figure 8:
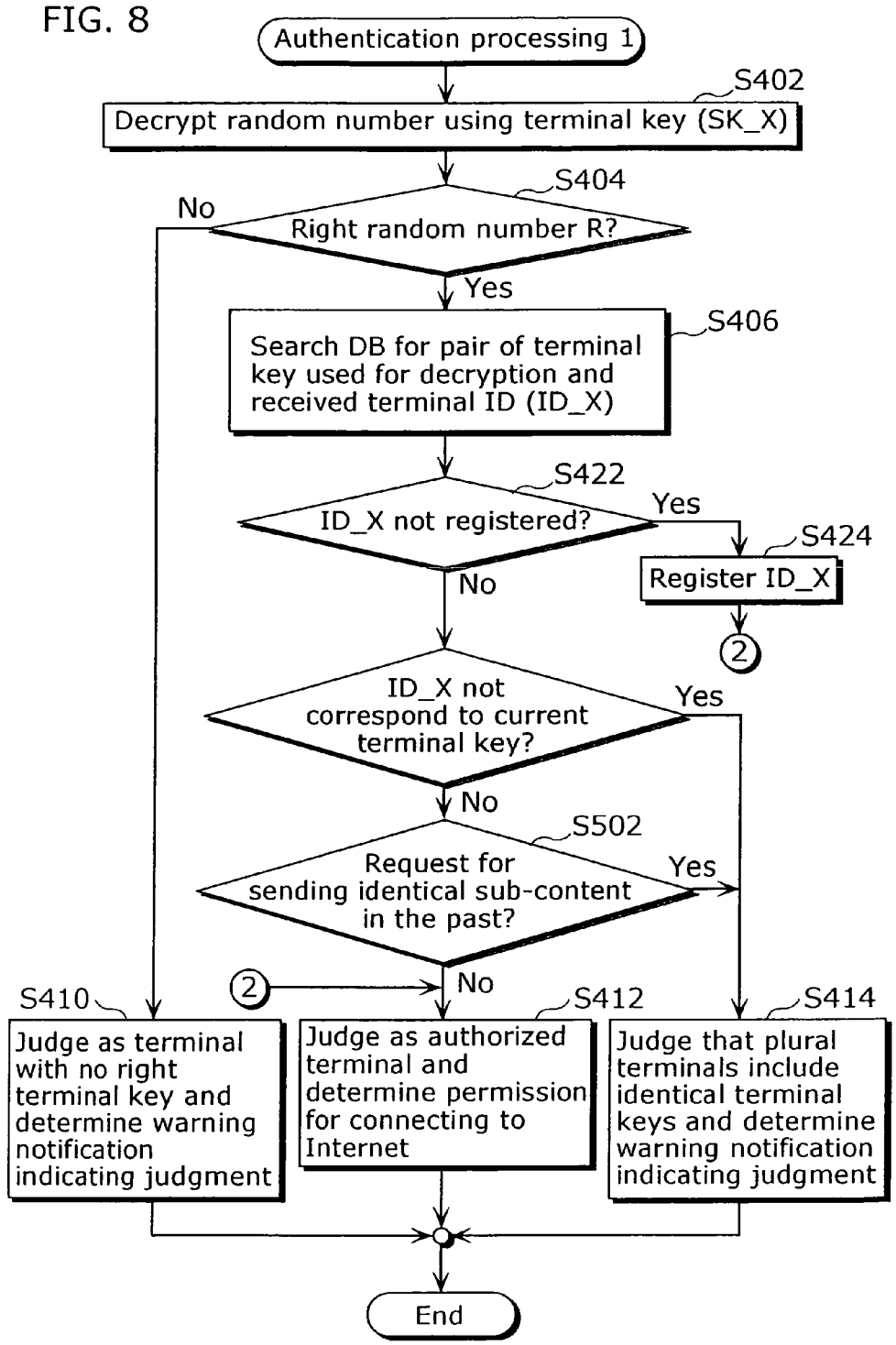
FIG. 8 is a flow chart showing the flow of a variation of authentication processing 1 in an authentication server shown in FIG. 5 and FIG. 6.

FIG. 8 is a flow chart showing the processing descriptions of the authentication processing in the above FIG. 5 and FIG. 6 (S312) in this variation. FIG. 8 differs from the flow charts of the above FIG. 5 and FIG. 6 in that the terminal judges as "This is an unauthorized terminal that has a copy terminal key." in the case where there is an identical sub-content send request in the past when referring to the authentication DB 45 (S502: Yes).

Up to this point, with the authentication server in this variation, counting the number of accesses makes it possible to judge whether it is an unauthorized terminal or not in the case where there are plural DVD terminals that have an identical terminal key and a terminal ID.

(Variation 2)

An example where the authentication server judges whether the DVD terminal is an authorized terminal or not using a secret key (common key) that is previously shared by the authentication server and the DVD terminal based on the encrypted random number R and the terminal ID that are received from the DVD terminal 20 has already been explained in the above embodiment, but an example of detecting an unauthorized terminal using a public key encryption method will be explained in this variation. In the case of this variation, a pair of the terminal ID and the terminal key may be registered after the authorization between the authentication servers.

Note that the functional structure of the authentication server and the DVD terminal in this variation is the same as the functional structure of the authentication server 40 and the DVD terminal 20 in the above embodiment except that the former has a function for using a public key encryption system and a digital signature.

Figure 9:
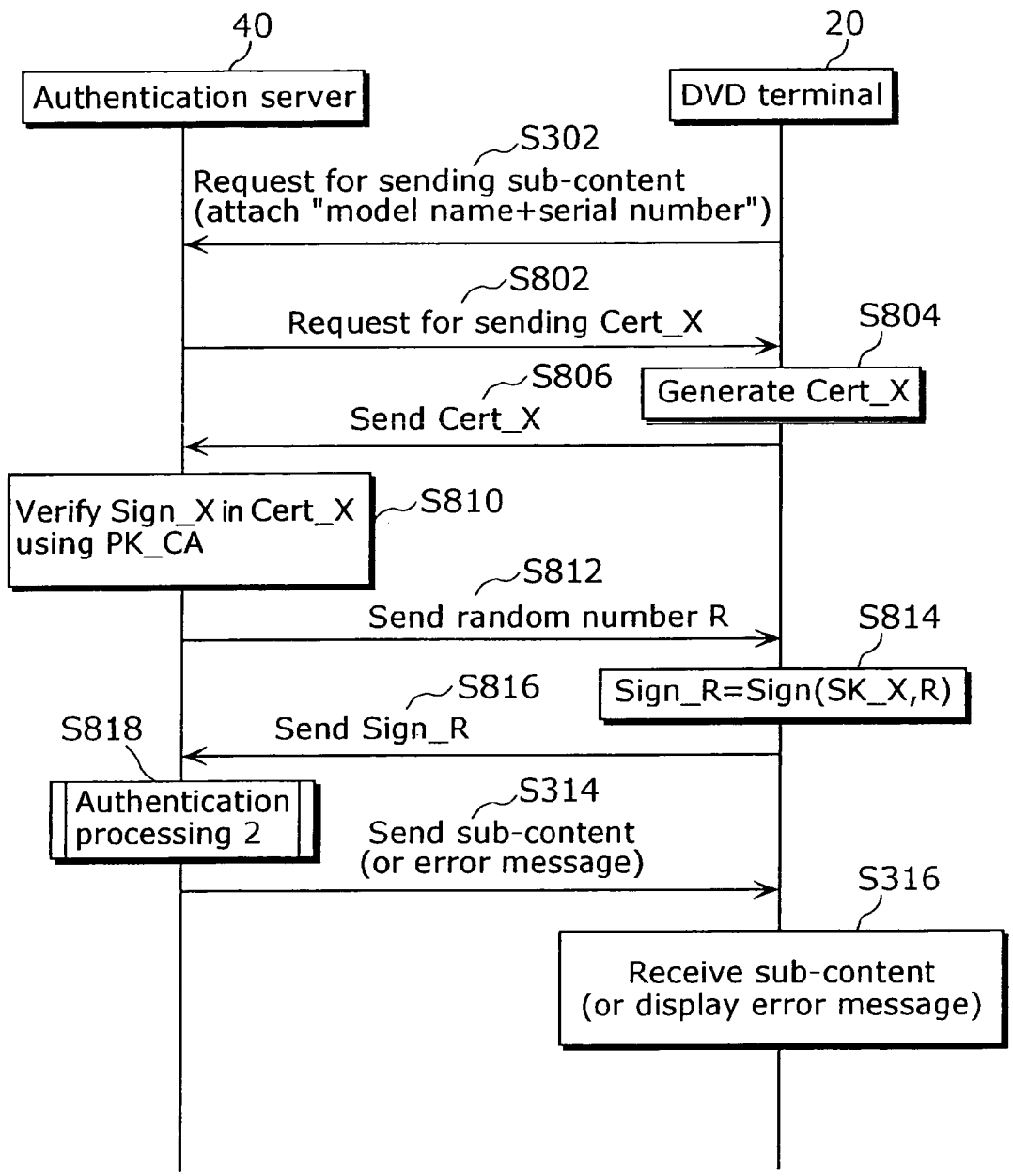
FIG. 9 is a communication sequence diagram between a DVD terminal and an authentication server in a variation 2.

FIG. 9 is a communication sequence diagram between the authentication server 40 and the DVD apparatus 20 of this variation.

First, the DVD terminal 20 requests the authentication server 40 to send the sub-content (in this case, "a model name and a serial number" of the DVD terminal 20 is attached) (S302). In this case, the authentication server 40 requests the DVD terminal 20 to send Cert_X (S802). Here, "Cert_X" is the data including a terminal ID, a public key (PK_X) corresponding to the terminal key (SK_X) and a digital signature (Sign_X) of the Certificate Authority (CA) (not shown in any figures) attached to the data where a terminal ID and a public key (PK_X) corresponding to the terminal key (SK_X) are connected to each other. (Like the case mentioned above, a digital signature may be given to the pair of "the model name and the serial number" and "the public key of the DVD terminal 20).

In this way, the DVD terminal 20 sends the generated Cert_X to the authentication server 40 (S804 and S805).

Next, on receiving the Cert_X from the DVD terminal 20, the authentication server 40 verifies whether the digital signature Sign_X in the Cert_X is the digital signature of the data where the public key (PK_X) and the terminal ID are connected to each other using a public key for verifying a certificate (PK_CA) (S810). Here, in the case where it is confirmed that the Sign_X is authorized, the authentication server 40 generates the random number R and sends it to the DVD terminal 20 (S812).

On receiving the random number R, the DVD terminal 20 writes a digital signature (=Sign_R) on the random number R using a terminal key (SK_X) in the apparatus (S814), and sends it to the authentication server 40 (S816).

After that, the authentication server 40 verifies the terminal ID and the public key that are received in the above-mentioned way (S818).

In the case where the authentication server 40 confirmed the authenticity of the above terminal ID and a public key as a result of the authentication, it sends the sub-content to the DVD terminal 20 (S314). On the other hand, in the case where it cannot confirm the authenticity of the above terminal ID and the public key, it sends an error message to the DVD terminal 20 (a statement in the parentheses of S818). Note that the processing for receiving the sub-content (or displaying an error message) by the DVD terminal 20 (S316) is the same as the processing in the above FIG. 5 and FIG. 6.

Figure 10:
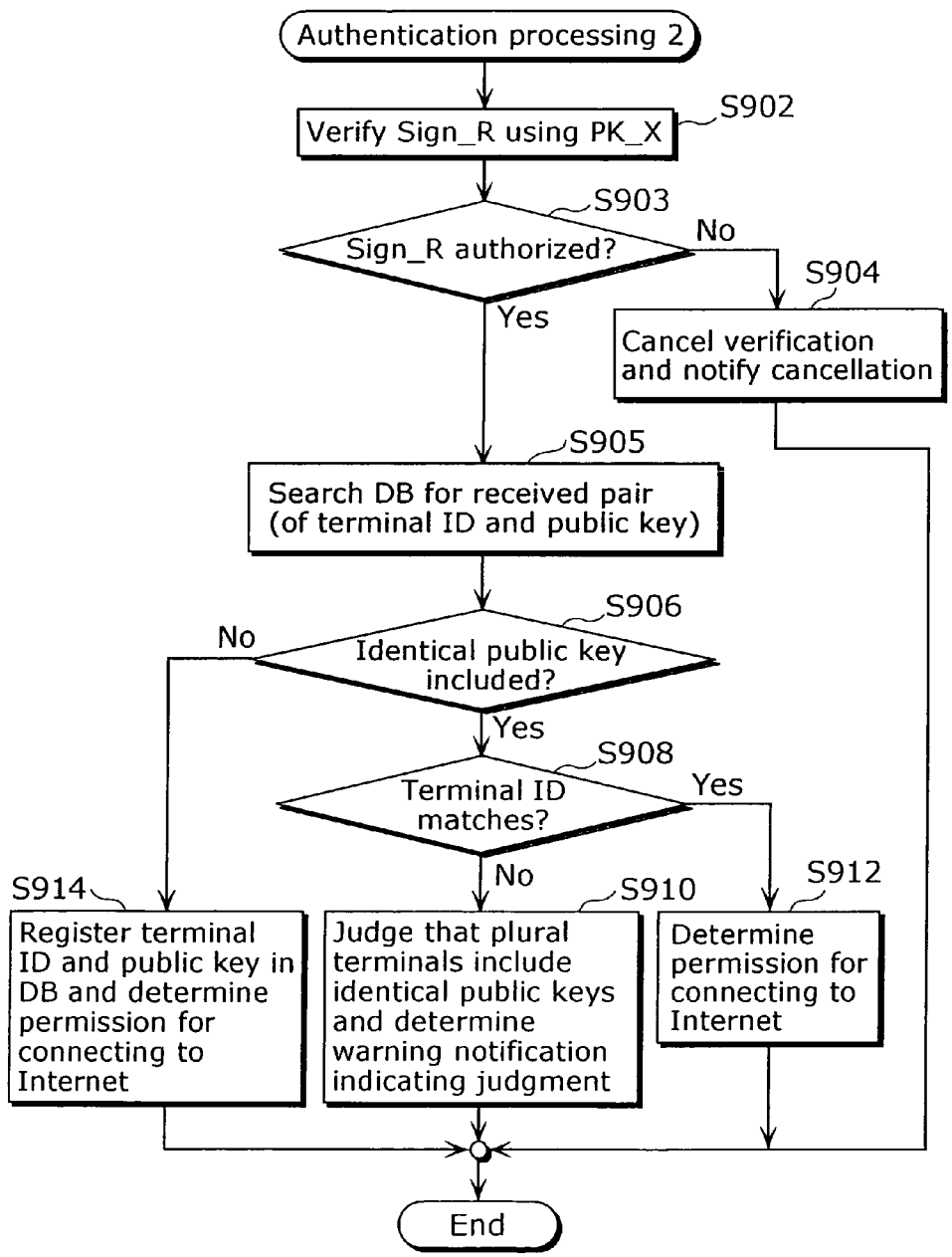
FIG. 10 is a flow chart showing the flow of authentication processing 2 in the authentication server shown in FIG. 9.

FIG. 10 is a flow chart showing the flow of the authentication processing 2 (S818) in the above FIG. 9.

First, the authentication server 40 verifies whether the above Sign_R is the digital signature by the terminal key (SK_X) corresponding to the random number R or not using the public key (PK_X) corresponding to the terminal key (SK_X) (S902). In this case, in the case where it is impossible to confirm that the Sign_R is authorized (S903: No), the authentication is cancelled and the fact is notified to the DVD terminal 20 (S904).

On the other hand, in the case where it is confirmed that the Sign_R is authorized (S903: Yes), the authentication server 40 searches the authentication DB 45 for a pair of the terminal ID (ID_X) of the DVD terminal 20 and the public key (S905).

Here, in the case where there is no public key (S906: No) and the received "model name and serial number" is not registered, the authentication server 40 judges that the DVD terminal is a new authorized one, registers the above terminal ID and the public key in the authentication DB 45 and determines permitting the connection to the Internet (S914).

On the other hand, in the case where a public key is identical but a terminal ID is not identical (S908: No), the authentication server 40 judges that the terminal is an unauthorized terminal because an identical terminal key is stored in plural DVD terminals, and sends a warning notification indicating the fact to the DVD terminal 20 (S910). Note that in the case where a terminal ID is identical too, it judges that the DVD terminal is the authorized terminal and determines permitting the connection to the Internet (S912).

Note that an example case where there is one center 50 that has already been explained in the unauthorized terminal detection system 5 in the above embodiment, but sharing the information on the pair of the above terminal key and the terminal ID among all the centers (for example, preparing a common server for storing the information on the pair of the terminal key and the terminal ID) makes the present invention applicable even in the case where there are plural centers.

In addition, in the above embodiment and variations, a DVD terminal as a verification terminal is explained as an example, but the verification terminal is not limited to this, and it may be an apparatus that can apply various encryption systems for digital contents such as CD players and personal computers.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

The authentication server is applicable as a content server that can distribute an encrypted content via the network protecting the copy right of a digital content via the network, and a method and a system for detecting an unauthorized terminal in this present invention are practical as a network system for distributing the encrypted content protecting the copy right via the network.

The invention claimed is:

1. A server that detects an unauthorized terminal from among a plurality of terminals, said server comprising:
   a terminal information receiving unit operable to receive terminal information from each respective terminal of the plurality of terminals, the terminal information received from each respective terminal including (i) key identification information that is unique to secret key information, the secret key information and the key identification information being assigned to the respective terminal in advance, (ii) authentication information that is defined based on the secret key information, and (iii) additional identification information that is assigned to the respective terminal;
   a terminal information holding unit operable to hold server terminal information including (i) the key identification information, (ii) at least one of the secret key information and public key information corresponding to the secret key information, and (iii) the additional identification information;
   a key information selection unit operable to output at least one of the secret key information and the public key information, based on the key identification information included in the terminal information received by said terminal information receiving unit, wherein the at least one of the secret key information and the public key information output by said key information selection unit is held in said terminal information holding unit;
   a terminal verification unit operable to verify the authentication information received by said terminal information receiving unit, based on the at least one of the secret key information and the public key information output by said key information selection unit;
   a terminal information search unit operable to search the server terminal information held in said terminal information holding unit, based on the received key identification information; and
   an unauthorized terminal judgment unit operable to judge that a terminal, of the plurality of terminals, that corresponds to the additional identification information is an unauthorized terminal when a predetermined number or more of different pieces of additional identification information has been searched by said terminal information search unit, for identical key identification information.

2. The server according to claim 1,
   wherein the additional identification information assigned to each respective terminal information concerning a user who uses the respective terminal.

3. The server according to claim 1,
   wherein the additional identification information assigned to each respective terminal is information that an owner of the respective terminal inputs into the respective terminal.

4. The server according to claim 1,
   wherein the additional identification information assigned to each respective terminal is an IP address of the respective terminal.

5. The server according to claim 1, further comprising:
   a receiving unit operable to receive the additional identification information from an operator of said server; and
   an unregistered additional identification information judgment unit operable to judge whether the received additional identification information is registered in the server terminal information held in said terminal information holding unit,
   wherein said terminal information holding unit is operable to register the additional identification information when (i) authenticity of the authentication information is verified, and (ii) said unregistered additional identification information judgment unit judges that the additional identification information is not registered.

6. The server according to claim 1,
   wherein, a terminal of the plurality of terminals is permitted to access a digital content related to a predetermined package content at predetermined times by accessing said server via a network,
   wherein said server includes a history holding unit operable to hold access history information indicating history of the digital content accessed by the plurality of terminals in units of each of the terminals specified by a pair of (i) one of the secret key information, the public key information and the key identification information, and (ii) the additional identification information, and
   wherein said unauthorized terminal judgment unit is operable to judge that a terminal of the plurality of terminals is an unauthorized terminal when the digital content is accessed, in excess of an access limit, by a terminal, of the plurality of terminals, that has one of the secret key information, the public key information, the key identification information, and the additional identification information, that is identical to that of the terminal judged to be unauthorized.

7. An unauthorized terminal detection system comprising a server that detects an unauthorized terminal from among a plurality of terminals and a terminal, from among the plurality of terminals, connected to said server,
   wherein said terminal includes a terminal information transmitting unit operable to transmit terminal information to said server, the terminal information transmitted by said terminal including (i) key identification information that is unique to secret key information, the secret key information and the key identification information being assigned to said terminal in advance, (ii) authentication information that is defined based on the secret key information, and (iii) additional identification information that is assigned to said terminal, and
   wherein the server includes:
      a terminal information receiving unit operable to receive, from each respective terminal of the plurality of terminals, terminal information including (i) the key identification information that is unique to the secret key information, the secret key information and the key identification information being assigned to the respective terminal in advance, (ii) the authentication information that is defined based on the secret key information, and (iii) the additional identification information that is assigned to the respective terminal;
      a terminal information holding unit operable to hold server terminal information of each respective terminal, the server terminal information including (i) the key identification information, (ii) at least one of the secret key information and public key information corresponding to the secret key information, and (iii) the additional identification information;
      a key information selection unit operable to output at least one of the secret key information and the public key information, based on the key identification information included in the terminal information received by said terminal information receiving unit, wherein the at least one of the secret key information and the public key information output by said key information selection unit is held in said terminal information holding unit;

a terminal verification unit operable to verify the authentication information received by said terminal information receiving unit, based on the at least one of the secret key information and the public key information output by said key information selection unit;

a terminal information search unit operable to search the server terminal information held in said terminal information holding unit, based on the received key identification information; and an unauthorized terminal judgment unit operable to judge that a terminal, of the plurality of terminals, that corresponds to the additional identification information is an unauthorized terminal when a predetermined number or more of different pieces of additional identification information has been searched by said terminal information search unit, for identical key identification information.

8. An unauthorized terminal detection method that is performed by a server to detect an unauthorized terminal from among a plurality of terminals and performed by a terminal, of the plurality of terminals, connected to the server, said method comprising:

receiving terminal information from each respective terminal of the plurality of terminals, the terminal information received from each respective terminal including (i) key identification information that is unique to secret key information, the secret key information and the key identification information being assigned to the respective terminal in advance, (ii) authentication information that is defined based on the secret key information, and (iii) additional identification information that is assigned to the respective terminal;

outputting at least one of the secret key information and the public key information, based on the key identification information included in the terminal information received by said receiving, wherein the at least one of the secret key information and the public key information output by said outputting is held in the server;

verifying the authentication information received by said receiving, based on the at least one of the secret key information and the public key information output by said outputting;

searching server terminal information that is held in the server and that includes pieces of the terminal information, the server terminal information being searched based on the received key identification information; and judging that a terminal, of the plurality of terminals, that corresponds to the additional identification information is an unauthorized terminal when a predetermined number or more of different pieces of additional identification information has been searched by said searching, for identical key identification information.

* * * * *

UNITED STATES PATENT AND TRADEMARK OFFICE
CERTIFICATE OF CORRECTION

PATENT NO. : 7,698,743 B2 Page 1 of 1
APPLICATION NO. : 10/577435
DATED : April 13, 2010
INVENTOR(S) : Motoji Ohmori et al.

It is certified that error appears in the above-identified patent and that said Letters Patent is hereby corrected as shown below:

On the Title Page, Item (57) Abstract

Please replace the Abstract with the following:

-- A DVD terminal (20) makes a request for sending a sub-content (e.g., "model name" and "serial number" of the DVD terminal (20)) to an authentication server (40) (S302). The authentication server (40) generates a random number R (S304) and sends it to the DVD terminal (20) (S306). The DVD terminal (20) reads a terminal key and a terminal ID that are stored in a terminal information memory unit (25), decrypts the received random number R using a terminal key (SK_X) (S308) and sends the decrypted random number R and the terminal ID (ID_X) to the authentication server (40) (S310). The authentication server (40) verifies the random number R and the terminal ID that are received from the DVD terminal (20), and judges whether the DVD terminal (20) is the authenticated terminal or not (S312) --

Signed and Sealed this

Seventh Day of September, 2010

David J. Kappos
*Director of the United States Patent and Trademark Office*